Figure 1:
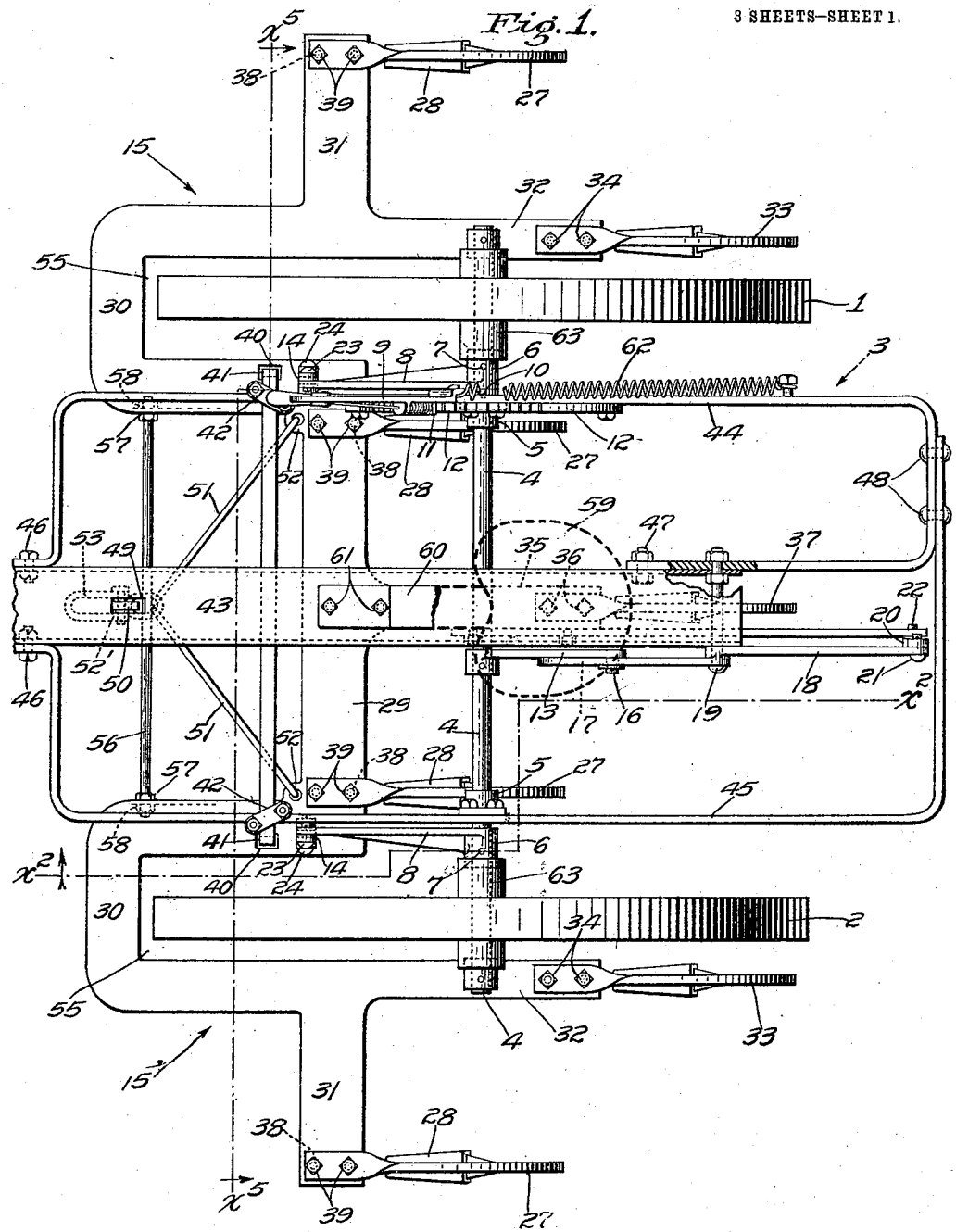

D. T. DENTON.
WHEELED CULTIVATOR.
APPLICATION FILED JAN. 30, 1912.

1,122,370.

Patented Dec. 29, 1914.

3 SHEETS—SHEET 1.

Witnesses:
W. N. Kirkby
Julia Townsend

Inventor,
Daniel T. Denton
by James R. Townsend
his atty.

D. T. DENTON.
WHEELED CULTIVATOR.
APPLICATION FILED JAN. 30, 1912.
1,122,370.
Patented Dec. 29, 1914.
3 SHEETS—SHEET 2.
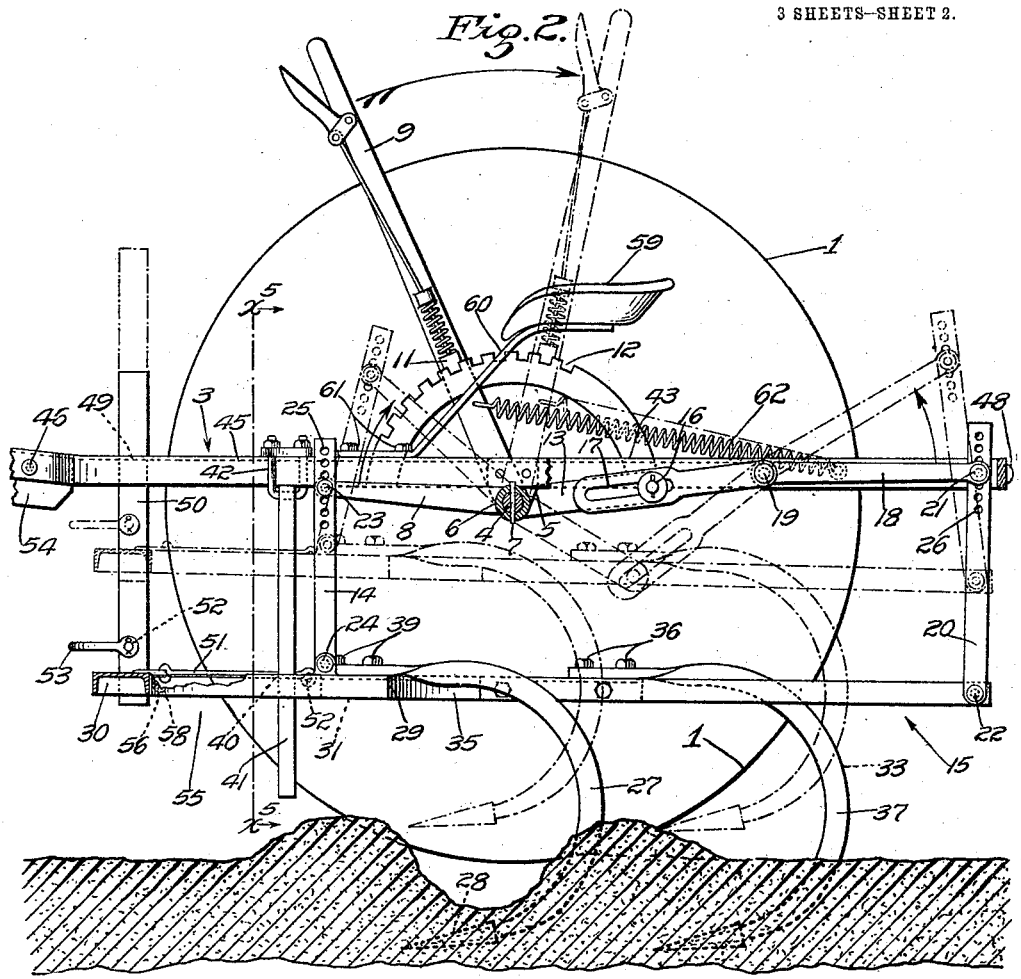
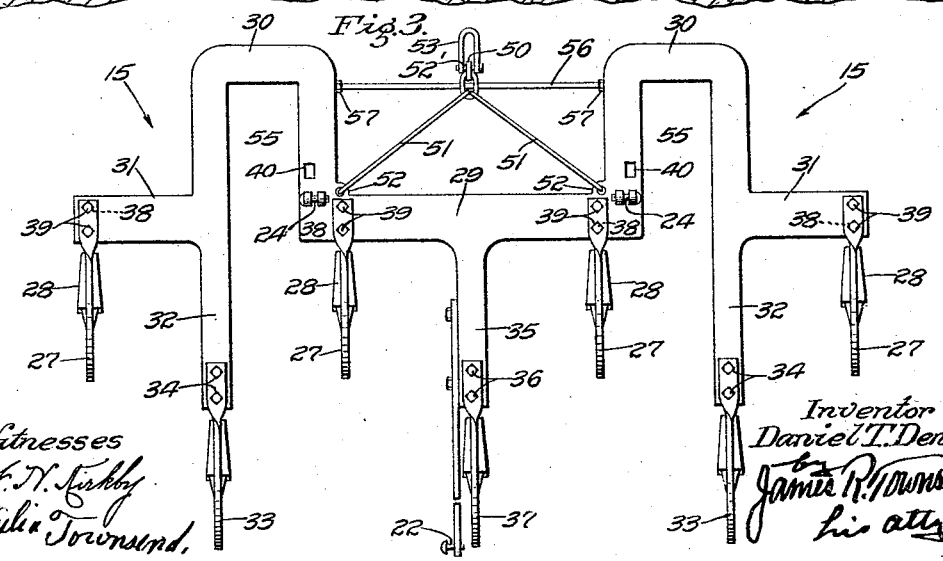

D. T. DENTON.
WHEELED CULTIVATOR.
APPLICATION FILED JAN. 30, 1912.

1,122,370.

Patented Dec. 29, 1914.

3 SHEETS—SHEET 3.

Witnesses:
W. N. Kirkby
Julia Townsend

Inventor
Daniel T. Denton
James R. Townsend,
his Atty.

UNITED STATES PATENT OFFICE.

DANIEL T. DENTON, OF UPLAND, CALIFORNIA.

WHEELED CULTIVATOR.

1,122,370. Specification of Letters Patent. Patented Dec. 29, 1914.

Application filed January 30, 1912. Serial No. 674,414.

*To all whom it may concern:*

Be it known that I, DANIEL T. DENTON, a citizen of the United States, residing at Upland, in the county of San Bernardino and State of California, have invented a new and useful Wheeled Cultivator, of which the following is a specification.

This invention is adapted for the construction of wheeled cultivators to be used in cultivating lands of all kinds, but is more particularly adapted for satisfactory work in uneven fields such as those to which irrigation is applied, where deep furrows such as irrigation ditches have to be crossed by the cultivator.

An object of the invention is to provide a riding cultivator especially adapted for cultivation of orange orchards; for dry land farming and for deep sub-soiling where it is desirable to stir the soil deeply without bringing the sub-soil to the surface of the ground and to practically leave the surface unstirred while the sub-soil is thoroughly loosened.

In cultivating irrigation fields with cultivators of the usual wheeled type, a great unevenness of draft results from the variation in the depth to which the teeth enter the earth by reason of the ground wheels dropping down into the irrigation furrows, thus causing the teeth to sink more deeply into the earth at such times, and as the wheels rise out of the irrigating ditch the teeth are again drawn upward so that they do not enter to so great a depth, and so on across the field.

An object of this invention is to provide a wheeled cultivator which will cultivate with practically the same draft across an irrigating field regardless of the irregularities of surface formed by the irrigating furrows.

Another object is to make provision for lighter draft in cultivating and stirring the soil.

A feature of this invention is the construction whereby the teeth are carried by two ground wheels that will not fall to the bottom of the irrigation ditches or furrows, but will ride over the same and the ridges at the sides thereof with practically slight variation from a level course.

In this invention the cultivator teeth are mounted on a beam adjustably supported from a carriage frame that is carried on high wheels of large diameter and the cultivator teeth are mainly arranged in line with each other transversely of the draft line and practically vertically beneath the axle of the implement, thus centering the resistance at that point or line where it can be most effectively overcome by the force applied to the front of the implement. Another advantage attained by thus practically mounting the teeth vertically beneath and in line with the pivotal axis, is that any rise and fall of the carriage wheels that may occur is transmitted to the teeth without any material increase in the amplitude of vertical movement.

Objects of this invention are: to provide a cultivator that can be carried on high wheels, of easy draft and to bring the teeth as nearly as possible into line with the wheels, transversely of the implement; to provide a cultivator in which the teeth will be raised and lowered vertically with relation to the main cultivator frame; to provide a cultivator in which the draft will be direct; to provide a cultivator in which the angle of the teeth with the surface of the ground will remain practically constant; and to provide a cultivator in which the teeth are arranged sufficiently close to the vertical plane of the axle to cause the supports upon which the cultivator rests, viz., the wheels and the teeth, to move in correspondence with each other in passing over uneven ground and furrows; and so that the carriage, the beam and the teeth may be evenly balanced on the axle. That is to say, in cultivators as ordinarily in practical use the teeth are mainly arranged behind the wheels, so that in passing over a furrow the wheels will reach the furrow first and will tilt the front end of the frame, and consequently the points of the teeth down so that the teeth will sink deeply into the earth, thus causing a wedging action of the earth between the wheels and the teeth, and a resultant excessive draft, which this invention avoids.

Further objects are strength, rigidity, light draft, cheap construction.

Another object is to provide a cultivator which is evenly balanced, the teeth of which can be easily raised out of and inserted into the ground.

The invention may be variously carried out and includes the implement and the parts and combinations of parts more particularly set forth in the subjoined detail description.

As the points of cultivator teeth become worn, they require increased pitch in order to enter the ground, and an object of this invention is to make provision whereby the pitch of the teeth can be conveniently and properly adjusted when required.

The accompanying drawings illustrate the invention.

Figure 4:
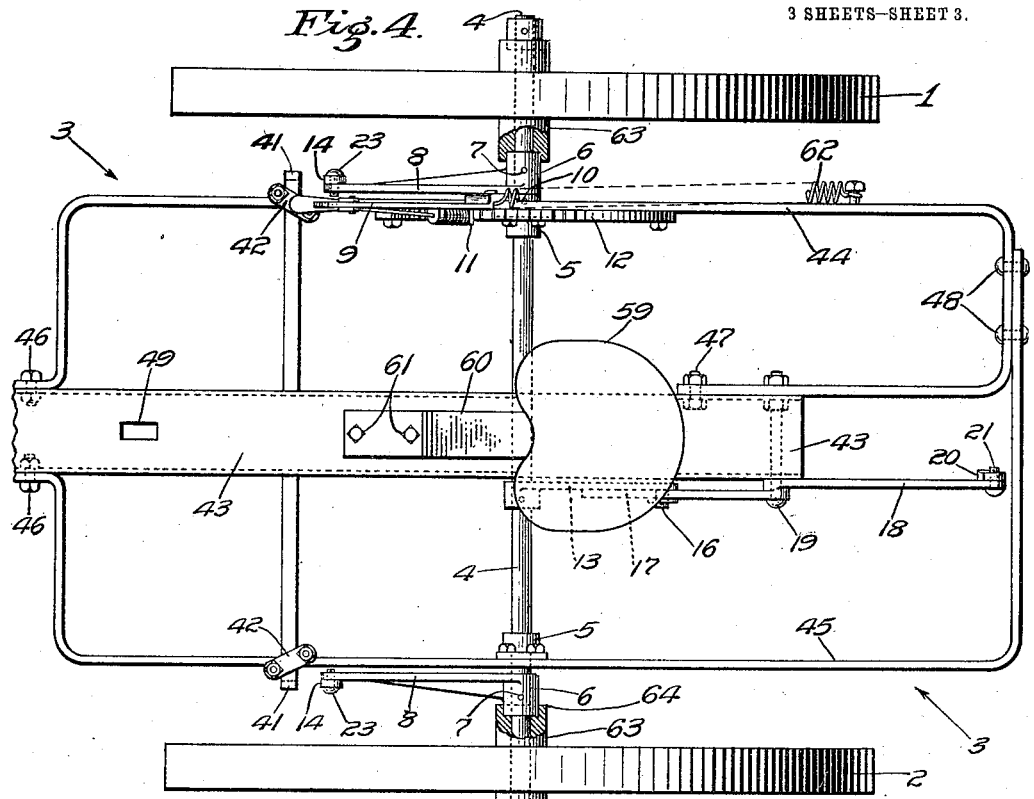
Figure 5:
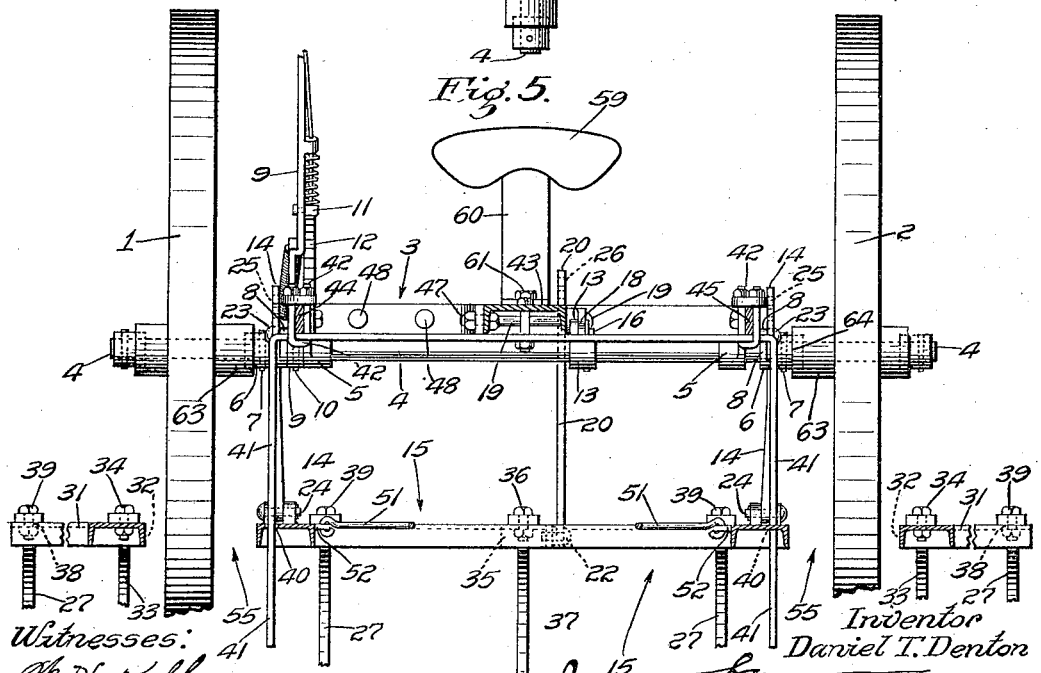

Figure 1 is a fragmental plan of the cultivator in operation. Fig. 2 is a fragmental sectional elevation from line $x^2$, Fig. 1, of a cultivator constructed in accordance with this invention; the teeth being seated in the ground. Dotted lines indicate the position of parts when the teeth are out of the ground for transportation. Fig. 3 is a plan of the cutivator beam detached with teeth and draft attachments thereon. Fig. 4 is a plan of the carriage frame shown in Fig. 1, mounted on its axle and wheels. The beam is omitted from this view to avoid confusion. Fig. 5 is a sectional elevation from line $x^5$, Figs. 1 and 2, the wheels being shown intact, except at the bottom of the view which is broken to economize space.

In the several figures parts are broken to facilitate illustration and contract the view; and arrows on the section lines indicate the direction of sight.

The cultivator is provided with two high carriage wheels, 1, 2, having a diamater nearly equal to the length of the carriage frame 3 that is supported by the axle 4 on which are journaled the wheels 1 and 2 at the ends thereof, and the carriage frame 3 by bearings 5 between the wheels; said axle being mounted as a rock shaft and being preferably straight and cylindrical from end to end and secured against endwise movement relative to the frame 3 by collars 6 fixed to the axle by pins 7 and carrying crank arms 8 which turn with the axle whenever it is turned by the hand lever 9 that is fixed by pin 10 to the axle and is provided with a latch 11 acting in a toothed segment 12 that projects up from the frame 3 and adjustably holds the lever in fixed relation to the frame.

The axle 6 constitutes a rock shaft having the upwardly projecting operating lever 9, the front crank arms 8 and rear crank arm 13.

The front crank arms 8 are adjustably connected by front connecting rods 14 with a tilting beam 15 in front of the vertical transverse plane in which the axis of the axle 4 extends. The rear crank arm 13 is connected by a loose motion connection formed by a pin 16 working in a slot 17 at the front end of the rear controlling lever 18 which is fulcrumed to the frame by a pin 19 and is adjustably connected at its rear end with the beam 15 through the adjustable rear connecting rod 20 that is pivotally connected by the pin 21 to the lever 18 and by the pin 22 to the beam 15.

The front connecting rods 14 are pivotally connected with the front crank arms 8 by pins 23 and with the beam 15 by pins 24, being provided with series of pin holes 25 for the pins 23 to allow adjustment. The rear connecting rod 20 is provided with pin holes 26 for the pin 21 to allow adjustable connection between the connecting rod and the lever 18. By adjusting the pin 21 to different holes 26 the beam may be brought into and out of horizontal parallelism with the frame; and by adjusting the pins 21 and 23, the beam may be bodily raised and lowered relative to the frame.

The curved teeth 27 may be rigid or spring teeth as desired and may be provided at their tips with suitable removable socket teeth points 28 and said teeth as shown in the drawings are adapted for use as subsoilers although it is understood that any form of cultivator teeth and points may be employed within the discretion or purpose of the user.

The beam 15 constitutes a part of my invention, being of a peculiar shape especially adapted for constructing my novel cultivator and comprises a practically integral member composed of a middle section 29, two loops 30 at opposite ends of the middle section, lateral extensions 31 projecting from the outer limbs of the loops, and rear beam extensions 32 projecting rearwardly from and forming rearward extensions of the outer limbs of the loops to support the outer rear teeth 33 that are fastened to the rear beam extensions 32 by the bolts 34.

The middle section 29 of the beam is provided with a rear intermediate extension 35 to which is fixed by bolts 36 the middle rear tooth 37.

The middle section 29 and lateral extensions 31 of the beam are in line with each other and are provided with holes 38 to receive bolts 39 that fasten the front set of teeth 27 to the beam. The holes 38 are arranged in lines parallel with the axle 4 and in front of the vertical plane of said axle.

The beam 15 is preferably a steel bar and may be cast or otherwise formed; and for the purpose of increased strength and lightness may be channel or T form in cross-section. The channel form is shown in the drawings. Near the ends of the middle section 29 the channel bar beam 15 is provided with vertical orifices 40 through which are extended guides formed by the downwardly bent ends of a cross bar or rod 41 that is rigidly fixed to the frame 3 by suitable means as the clips 42. The orifices 40 are elongate lengthwise of the implement to allow the beam to move up and down freely while tilted.

The carriage frame is preferably constructed of a strong central frame piece 43 extending longitudinally of the implement midway between the wheels 1, 2. It may be a channel bar or may be of any other desirable cross-sectional form. The side members 44 and 45 of the frame are preferably steel bars bent into appropriate form and connected to the middle frame piece 43 and to each other by any suitable means as the bolts 46, 47 and rivets 48. These side members serve as braces and also as supports against lateral movement of the collars 6.

The center frame piece 43 is provided with a vertical orifice 49 through which is extended the upright draft standard 50 that is connected by links 51 with eyes 52 which are prepared therefor at the front of the middle section 29 of the beam close to the end of said section. The draft standard 50 is provided between the planes of the beam and the frame with a hitch hole 52' to receive the clevis 53 by which the draft appliances for attaching the team are connected.

The implement may be provided with any suitable steering means as a tongue. In Fig. 2 of the drawings a tongue 54 fastened to the middle frame member 43 is shown. The method of attaching tiller wheels to cultivators is well known and illustration thereof is not necessary.

The guide rods 41 and the draft standard 50 allow vertical movement between the beam and the carriage frame so that the beam may be raised and lowered at any time by manipulating the lever 9.

The teeth 27, 33 and 37 which are carried by the frame through the beam form two transversely extending sets and are in staggered relation to each other close to the transverse medial line of the machine, thus giving free release to trash which otherwise might accumulate on the shanks of the teeth as the implement is moved over the ground.

The loops 30 of the beam afford recesses 55 to accommodate the front portions of the wheels 1, 2, and said loops are fastened together at their front ends by the brace rod 56 which is secured thereto by nuts 57, 58.

The seat 59 is mounted on a spring 60 fastened by bolts 61 to the center frame piece 43.

The balancing spring 62 connects the lever arm 9 with the rear of the carriage frame to assist in lifting the beam and teeth as the lever is drawn back.

The pair of wheels 1, 2 are provided with inside recessed hubs 63 and the hubs 6 of the crank arms 8 form collars over which the rims 64 of the inner ends of the wheel hubs fit and revolve forming sand-proof boxes for the wheels.

By the looped beam shown having lateral and rearward extensions it is made possible to mount the cultivator teeth at practically the medial transverse plane of the cultivator both between the cultivator wheels and outside of such wheels. By this means the cultivator may be driven so that the wheels on one side thereof will run close to the low hanging limbs of the tree while the cultivator teeth outside of the wheels may cultivate underneath the limbs of the tree; and since the cultivator is thus provided with an equal number of teeth outside the wheels on each side, side draft is avoided.

In practical use the operator seated on the seat 59 will have control of the beam through the hand lever 9 to lower and raise the beam to increase and decrease the depth to which the teeth will extend below the bottom of the carriage wheels and the draft applied to the clevis 53 will draw the beam and the carriage frame simultaneously. The clevis is preferably attached nearer to the beam than to the carriage frame so that a leverage advantage will be given to draw the beam forward without unduly advancing the carriage frame relative thereto.

By providing high carriage wheels as shown, various advantages are secured, viz.: light and even draft, level course for the teeth on furrowed ground, and the provision of ample adjustment space beneath the carriage frame and axle to accommodate the beam and teeth when the teeth are raised out of the ground; thus allowing the bowed cultivator teeth to be mounted at the transverse medial portion of the cultivator.

The guide rod 41 is preferably formed of one piece being bent down from the intermediate portion of the rod and as the ends of said rod are rigid with the carriage frame and engage the beam, they hold the beam in parallelism with the axle and at the same time allow the beam to be freely raised and lowered by the crank arms and connecting rods connected with the axle.

In case the teeth become worn so as to require increased pitch in order that they may enter the ground instead of riding on their bottoms, the pin 21 can be adjusted to a lower hole 26 or the pin 23 can be adjusted to a higher hole; or both such adjustments can be made, thus tilting the beam downward forwardly and thus uniformly increasing the pitch of the teeth.

I claim:

1. The combination with a cultivator beam, a wheel supported axle, a frame on the axle, a lever fulcrumed to the frame and provided at its front end with a slot, a link connecting the rear end of the lever with the beam, a lever and two crank arms on the axle, means connecting one of said arms to the beam, and a pin on the other arm extending through the slot.

2. In a cultivator, an axle, wheels supporting the axle, a frame on the axle, a beam mounted below the level of the axle and provided with forwardly extending loops to accommodate the wheels, means connecting the beam with the frame, and two transversely extending sets of cultivator teeth mounted on the beam, one of said sets being substantially in vertical alinement with the axle and the other of said sets being behind said first set, and both of said sets extending outside of the wheels.

3. In a cultivator the combination with a wheel supported axle and a crank arm therefor; of a frame on the axle; a beam below the axle; a lever fulcrumed to the frame and provided with a slot in one end; a pin connecting the crank arm with the slot; a connection between the other end of the lever and the beam; and means to turn the axle.

4. A cultivator comprising a beam to which the cultivator teeth are secured; a carriage frame, an axle, a centrally located crank, mounted on the axle and extending rearwardly, a lever actuation member fulcrumed on said carriage frame, and adjusting means for connecting said member to the rear of the cultivator beam.

5. A wheeled cultivator comprising a tilting cultivator beam having cultivator teeth, means for adjustably tilting the cultivator beam, and means for raising and lowering said cultivator beam in the tilted position to which it is adjusted.

6. The cultivator beam described comprising an integral member composed of a middle section 29, two loops 30 at opposite ends of the middle section, lateral extensions 31 projecting from the outer limbs of the loops, rear beam extensions 32 projecting rearwardly from and forming rearward extensions of the outer limbs of the loops, and a rear intermediate extension 35 extending rearward from the middle section between said extensions 32.

7. A cultivator comprising a frame provided with an axle, wheels mounted to turn on and support the axle, a beam provided with cultivator teeth, connecting rods pivoted to the front and rear of the beam, a crank on the axle adjustably connected to the front connecting rod, a second crank on the axle, a lever pivoted to the frame and shiftably connected at one end to said second crank and adjustably connected at the other end to the rear connecting rod, and means to turn the axle.

In testimony whereof, I have hereunto set my hand at Upland, California, this 20th day of January, 1912.

DANIEL T. DENTON.

In presence of—
  T. C. BALCH,
  JAMES M. WEBSTER.

Copies of this patent may be obtained for five cents each, by addressing the "Commissioner of Patents, Washington, D. C."